United States Patent [19]

Saunders

[11] E Patent Number: Re. 32,791

[45] Reissued Date of Patent: Nov. 29, 1988

[54] CERVICAL TRACTION DEVICE

[76] Inventor: Harold D. Saunders, 9840 Purgatory Rd., Eden Prairie, Minn. 55344

[21] Appl. No.: 23,220

[22] Filed: Mar. 9, 1987

Related U.S. Patent Documents

Reissue of:

[64] Patent No.: 4,508,109
Issued: Apr. 2, 1985
Appl. No.: 338,479
Filed: Jan. 11, 1982

[51] Int. Cl.[4] ..... A61H 1/02

[52] U.S. Cl. ..... 128/75; 128/69

[58] Field of Search ..... 128/69–76 R, 128/84 C, 84 R, 87 B, 89 A, 83, 97; 272/134, 94; 269/328

[56] References Cited

U.S. PATENT DOCUMENTS

| | | | |
|---|---|---|---|
| 738,283 | 9/1903 | Blomqvist | 128/69 |
| 1,242,688 | 10/1917 | Hawley | 128/84 C |
| 1,301,276 | 4/1919 | Kroetz | 128/75 |
| 1,984,520 | 5/1932 | Curtis | 128/254 |
| 2,166,229 | 7/1939 | Anderson | 128/84 R |
| 2,273,088 | 1/1940 | Byers | 128/25 R |
| 2,534,587 | 12/1950 | Fisher et al. | 128/71 |
| 2,689,127 | 9/1954 | Silverton et al. | 277/134 |
| 2,831,482 | 4/1958 | Cobb | 128/84 |
| 3,060,925 | 10/1962 | Honsaker et al. | 128/25 |
| 3,293,667 | 12/1966 | Ohrberg | 5/62 |
| 3,336,922 | 4/1967 | Taylor | 128/75 |
| 3,387,605 | 6/1968 | Schmidt | 128/71 |
| 3,548,817 | 12/1970 | Mittasch | 128/75 |
| 3,596,655 | 8/1971 | Corcoran | 128/75 |
| 3,957,040 | 5/1976 | Calabrese | 128/75 |
| 4,154,478 | 5/1979 | Cohune | 297/397 |
| 4,166,459 | 9/1979 | Nightingale | 128/75 |

FOREIGN PATENT DOCUMENTS

| | | | |
|---|---|---|---|
| 997691 | 1/1952 | France . | |
| 2388548 | 12/1978 | France | 128/69 |
| 2038185 | 7/1980 | United Kingdom . | |

*Primary Examiner*—Charles Pearson
*Assistant Examiner*—Tonya Lamb
*Attorney, Agent, or Firm*—Bell, Seltzer, Park & Gibson

[57] ABSTRACT

A cervical traction device utilized on conventional traction tables which applies a tractive force to the back of the patient's skull approximate the occipital bone through the use of two V-shaped arms which are adjustably positioned behind the patient's head and mounted on a sliding carriage which has adjustable weights attached thereto. The carriage in turn slides on a stationary track which can be vertically and laterally adjusted to vary the flexion-extension angle.

17 Claims, 2 Drawing Sheets

CERVICAL TRACTION DEVICE

Matter enclosed in heavy brackets [ ] appears in the original patent but forms no part of this reissue specification; matter printed in italics indicates the additions made by reissue.

BACKGROUND OF THE INVENTION

The invention is a cervical traction device used to administer traction to patients with various musculoskeletal disorders of the neck and upper back. The device of the present invention is designed to be utilized with a conventional traction table with the patient in the supine position, which is lying substantially horizontal on his back.

In the prior art there have been a substantial number of head halters or other devices for applying cervical traction through the head of the patient. One category of these halter devices, such as shown in U.S. Pat. Nos. 1,301,276 and 3,548,817, engages the jaw of the patient while surrounding the head. These type of halters not only inhibit the ability of the patient to eat or talk, but also cause aggravation of the temporomandibular (jaw) points, and from a traction point of view are also less desirable. Jaw-type head halters of this type are pulling from an axis offset from the spine and thereby apply an undesirable twisting moment (cervical extension) to the patient's head and neck contrary to most types of desired traction. In most traction situations, it is desirable to engage the head of the patient at the occiput area of the head rather than the chin so that the pulling axis is more in alignment with the spine and concentrates the force posteriorly where it is most beneficial.

Another type of prior art device for engaging the head is typified in U.S. Pat. Nos. 2,166,229 and 3,336,922. These types of cervical braces, which are referred to in the trade as "halo type" actually contact the patient's head with pointed screws which are forced inward through the skin to make contact with the bone of the skull. Aside from the obvious pain which a patient must endure by this type of brace, the potential for infection to the person's head at the points where the skin is broken is ever present.

SUMMARY OF THE INVENTION

The cervical traction device of the present invention includes a pair of V-shaped adjustable arms which grip the rear area of the patient's head approximate the occipital bone and mastoid processes. The V-shaped arms are laterally adjustable to fit various size patients as well as being pivotally mounted so that the traction force on one side of the spine can be greater or lesser. The V-shaped arms are carried on a sliding carriage which in turn is attached to the traction weights or a mechanical traction machine through ropes and pulleys so as to apply a varying traction load. There is also a small headrest pad mounted on the carriage for supporting the back of the patient's head and an adjustable strap attached to the pad for surrounding and holding the patient's head in contact therewith. The sliding carriage is mounted on a track means which in turn is anchored at one end near the traction source while the opposing end rests on the surface of the table. The flexion-extension angle (rope angle to the table) can be changed by raising or lowering the height of the attachment point of the track means. Also, the lateral angle can be varied by moving the traction source, namely ropes, pulleys and weights, or mechanical traction machine, from side to side. The purpose of administering a traction force at an angle lateral to the mid-line of the spine is to concentrate greater force to one side of the spine than the other for particular disorders.

It is therefore the principal object of the present invention to provide a dynamic traction device which applies the traction force to the patient's skull along the occipital line and mastoid processes.

Another object of the present invention is to provide a cervical traction device which grips the rear of the head while leaving the mouth and jaw of the patient unrestricted.

Another object of the present invention is to provide an improved and simplified traction device for varying the vertical and lateral angles of traction pull relative to the mid-line of the patient's body.

Another object of the present invention is to provide a simplified cervical traction device which is very versatile, easily adjusted to various patients, and more comfortable for the person wearing same.

For the purpose of illustrating the invention, there is shown in the drawings a form which is presently preferred; however, it is understood that the invention is not limited to the precise arrangement as shown in the drawings.

DETAILED DESCRIPTION OF THE PREFERRED EMBODIMENT

Figures 5, 6, 7:
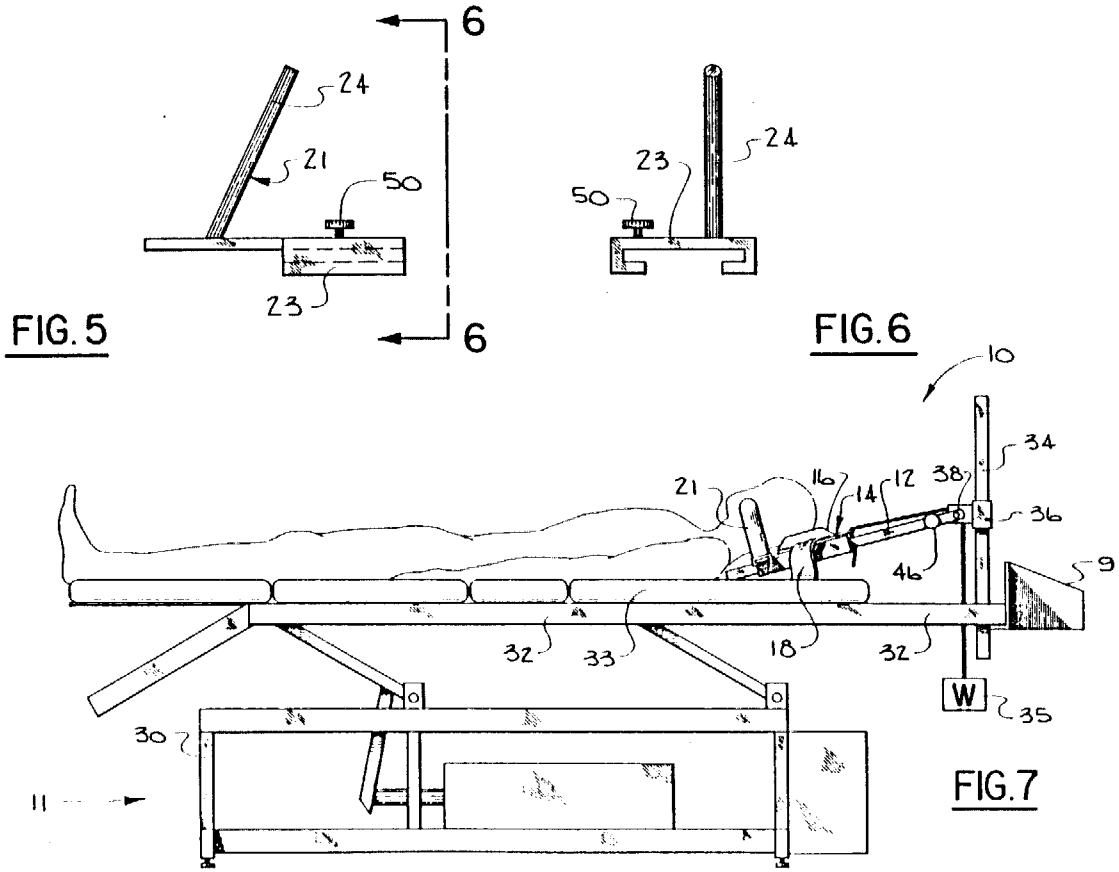
FIG. 5 is a detailed side elevational view of a canted arm with the cushion cover removed.
FIG. 6 is an elevational view taken along line 6—6 of FIG. 5.
FIG. 7 is a side elevational view of a conventional traction table with the traction device of the present invention shown thereon.

Referring to the drawing in detail, FIG. 7 illustrates a conventional traction table 11, with the traction device of the present invention generally described by reference numeral 10 mounted at its right end. The table 11 illustrated is merely typical of numerous well-known designs which are on the market and all of which can be readily used with the device 10 of the present invention. Table 11 includes a base 30 for supporting a frame 32 which in turn carries a pad 33 on which the patient lies. Attached to the right end of support frame 32 is an anchor post 34 which carries the traction weights 35, and the traction device 10 of the present invention. In place of weights 35, a conventional traction machine 9 can be used, which also attaches to the right end of frame 32. The various details of the traction table 11 or traction machine 9 are not described in detail since they are well-known in the prior art, and are not a part of the present invention.

Figure 1:
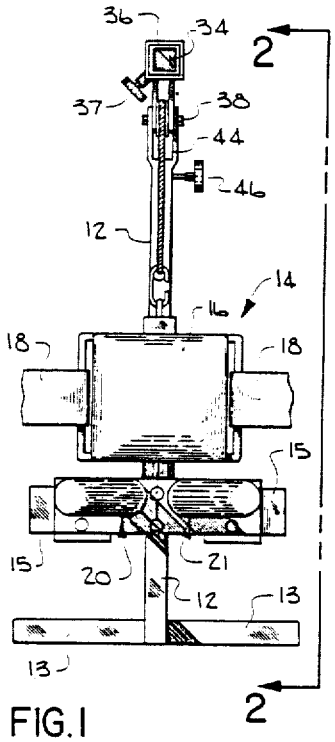
FIG. 1 is a top plan view of the cervical traction device shown mounted to the anchor post of a conventional traction table.

Adjustably positioned on post 34 is a bracket 36 which slides up and down and is held in place by set screw 37, as seen in FIG. 1. Passing through bracket 36 is a bolt 38 which has a dual function in providing an axle for the pulley traction rope 40, and also provides a releasable attachment point for the traction device 10 of the present invention.

In another type of conventional traction table and mechanical traction machine (not shown in the drawing), the traction device 10 attaches directly to the traction machine which can itself be adjusted vertically and laterally.

Figure 2:
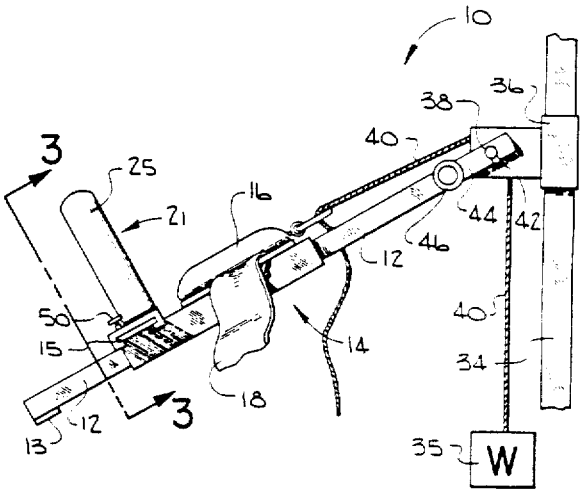
FIG. 2 is a side elevational view taken along line 2—2 of FIG. 1.

Traction device 10 comprises a hollow square tubular shaft 12 which acts as a track means for carriage 14 as it slides back and forth thereon. The upper end of shaft 12 includes a traverse slot 42 for engaging bracket 36 through bolt 38, as best seen in FIGS. 1 and 2. Shaft 12 includes a telescoping section 44 which allows the shaft 12 to be extended when desired by loosening of tightening screw 46. Attached to carriage 14 is rope 40 which transmits the variable force of traction weights 35 to the carriage 14 along whatever angle the shaft 12 is positioned relative to the top of table 11. Attached to the lower end of shaft 12 are lateral support legs 13, as best seen in FIG. 1, which rest upon the top surface of the traction table pad 33.

Figure 3:
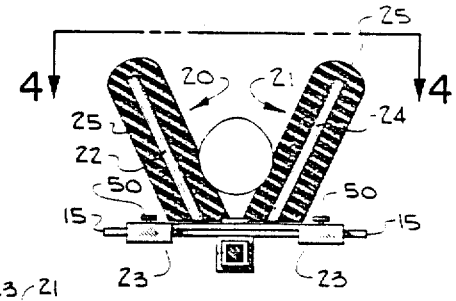
FIG. 3 is a sectional view taken along line 3—3 of FIG. 2.
Figure 4:
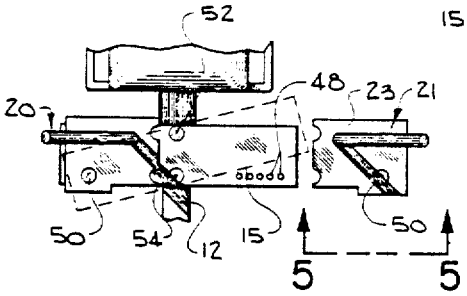
FIG. 4 is a partial top plan view taken along line 4—4 of FIG. 3, with the lateral extensions shown in an alternate dotted line position.

Carriage 14 comprises a box section tube with an interior dimension slightly greater than shaft 12, and supports thereon a pair of lateral extension members 15, which are seen in detail in FIG. 4. Extensions 15 in turn carry a pair of canted arms 20 and 21 which slide laterally back and forth across extensions 15. The various positions of arms 20 and 21 are determined by holes 48 in extensions 15 and locking pins 50. Lateral extensions 15 can also be made adjustable and rotated about bolt 52 to the dotted line position of FIG. 4 by the removal of bolt 54 from carriage 14. Arms 20 and 21 include rigid rods 22 and 24 anchored to a pair of base members 23 which in turn slide on extensions 15. Positioned over rods 22 and 24 are a pair of circular sponge covers 25 which contact and grip the back of the patient's head. Arms 20 and 21 are adjusted on extensions 15 so that the arms contact the occipital bone approximate the back of the patient's skull, as illustrated in FIG. 3.

Also attached to carriage 14 is a head support pad 16 which includes on both sides thereof a head band or strap 18 which releasably fits around the patient's head and maintains the head in contacting relationship with pad 16 and arms 20 and 21. The head support pad 16 can also be directly connected to extension members 15, so that when rotated about bolt 52 they both retain the relative positions to each other.

The arms 20 and 21 are shown to be straight in FIG. 3, however, they can also be shaped with a slight degree of concavity, when viewed from the FIG. 3 position.

Shaft 12 could have a different cross-sectional shape, such as an "I" beam.

OPERATION

The particular flexion extension angle (the rope angle to the table) which is desired for the particular patient, is set by releasing set screw 37 and sliding bracket 36 up or down to the proper vertical position, and resetting. The flexion extension angle can also be adjusted by releasing screw 46 and allowing the telescoping section 44 of shaft 12 to extend, which decreases the flexion angle. The support legs 13, at the end of shaft 12, can rest at any position on table pad 33, as seen in FIG. 7. The V-shaped arms 20 and 21 are adjustably positioned around the patient's head so that the arms contact the occipital bone at the base of the patient's skull, while the back of the patient's skull rests on pad 16. To retain the patient in proper position during the traction, the support strap 18 is snugly fastened around the patient's head. The patient can be anchored to the traction table 11 by various adjustable belts, not shown in the drawing. The amount of traction force applied to the patient is varied by changing the amount of weight 35 attached to rope 40, or by adjusting the amount of force set on the mechanical traction machine 9. If it is desirous to apply more traction force to one side of the patient's spine than the other, the extension members 15 are rotated to a dotted line position, as indicated in FIG. 4, by the removal and replacement of bolt 54. A lateral offset tractive force can also be accomplished by providing bracket 36 with a universal joint so that anchor post 34 can be moved or tilted to one side of the mid-line spinal axis of the patient.

The tractive force is applied to the patient's skull through the V-shaped arms 20 and 21 along the occipital line and mastoid processes. This is more comfortable for the patient and also concentrates the force posteriorly where it is most beneficial.

Having described the invention with sufficient clarity to enable those familiar with the art to construct and use it, I claim:

1. A cervical traction device for use on conventional traction tables with a dynamic traction mechanism including weights, ropes and pulleys anchored to one end of the table comprising:

a track means positioned longitudinally on the traction table and attached at one end to the traction mechanism;

a carriage slidably mounted on the track means including a head support pad and lateral extensions positioned below the support pad, the ropes of the traction mechanism being attached to the carriage whereby varying loads are applied to said carriage;

a pair of upwardly extending outwardly canted arms mounted on the lateral extensions of the carriage and adjustable laterally along said extensions and adapted to purchase on the occipital bone of a patient's head; and a head band means attached to the carriage for holding the patient's head against the support pad of the carriage.

2. A cervical traction device as set forth in claim 1, wherein the traction mechanism includes a vertically adjustable traction source to which said one end of the track means is attached whereby the angle at which the traction device pulls with respect to the plane of the table can be varied.

3. A cervical traction device as set forth in claim 1, wherein the pair of arms on the carriage includes resilient covers for contact with the patient's head and adjustment means on the arms for adjusting the lateral spacing between the two arms.

4. A cervical traction device as set forth in claim 1, wherein the lateral extensions on the carriage include releasable adjustment means allowing the extensions to rotate whereby the traction force on the patient's spine can be varied from side to side.

5. A cervical traction device as set forth in claim 1, wherein the track means is a box section metal tube having telescopic sections to vary its lengths and includes a pair of support legs at the opposite end of said track means for contacting said table.

6. A cervical traction device as set forth in claim 1, wherein the pair of arms are positioned at an angle of approximately 60° to each other in any adjusted position.

7. A cervical traction device as set forth in claim 1, wherein the pair of arms are each concave in shape relative to each other in a substantially U-shape.

8. A cervical traction device for use on conventional traction tables comprising:

an anchor post attached to the table at one end thereof;

traction means attached to the anchor post including weights, ropes and pulleys;

a track means attached at one end to the anchor post and positioned substantially longitudinally on the traction table;

a carriage slidably mounted on the track means including a head support pad and lateral extensions extending from said carriage, said carriage being attached to the rope of the traction means whereby varying loads can be attached to said carriage;

a pair of outwardly canted arms adjustably mounted on the lateral extensions of the carriage and adapted to purchase on the occipital bone of a patient's head; and a head band means attached to the carriage for holding the patient's head against the support pad.

9. A cervical traction device as set forth in claim 1, wherein the pair of arms on the carriage includes resilient covers circular in cross section with the arms positioned concentrically in the center thereof for contact with the patient's head and adjustment means on the arms for adjusting the lateral position of the arms on the lateral extensions.

10. An apparatus for applying a therapeutric traction force to the body of a patient along a line in general alignment with the spine, and comprising:

track means adapted to be positioned longitudinally on a traction table or the like;

carriage means mounted for longitudinal movement along said track means, said carriage means including a head support pad adapted to restingly receive the head of the patient, head band means for holding the patient's head against said head support pad, and body engaging means for operatively engaging the occipital area of the patient's head when the patient's head is held against said head support pad by said head band means, said body engaging means comprising a pair of upwardly extending and outwardly canted arms, and means mounting said arms so as to permit adjustment of the lateral separation thereof, and means for applying a longitudinally directed traction force to said carriage means and such that a force may be applied to the occipital area of the head of the patient and in general alignment with the spine.

*11. An apparatus for applying a therapeutic traction force to the body of a patient along a line in general alignment with the spine, and comprising*

*track means adapted to be positioned on a traction table or the like and so as to extend in a longitudinal direction,*

*carriage means mounted for slideable movement in the longitudinal direction along said track means,*

*attachment means mounted to said carriage means for attachment thereto of a force applying means so that a force may be applied to said carriage means which tends to move the same in the longitudinal direction along said track means,*

*upstanding body engaging means configured for engaging the occipital area of the patient's head which is restingly received thereon, and*

*means mounting said body engaging means to said carriage means for selective pivotal movement about an upright pivotal axis which is substantially perpendicular to the longitudinal direction, and whereby the lateral angle of the traction force relative to the midline of the patient's body may be laterally adjusted.*

*12. The apparatus as defined in claim 11 wherein said means mounting said body engaging means to said carriage means includes plate-like extension means, means mounting said body engaging means to said extension means, and pivot pin means extending along said upright pivotal axis and pivotally mounting said extension means and thus said body engaging means to said carriage means.*

*13. The apparatus as defined in claim 12 further comprising means for selectively retaining said extension means and said body engaging means in a selected pivotal position relative to said carriage means.*

*14. The apparatus as defined in claim 12 further comprising a head support pad adapted for restingly receiving the head of the patient thereon, with said head support pad being fixedly connected to said extension means so as to be positioned on one longitudinal side of said body engaging means, and so that said head support pad and said body engaging means pivot together about said pivotal axis.*

*15. The apparatus as defined in claim 14 further comprising head band means mounted to said head support pad for holding the patient's head against said head support pad and said body engaging means.*

*16. The apparatus as defined in claim 12 wherein said track means includes means mounted at one end thereof for releasably engaging an anchor post or the like which is fixed to the traction table, and a pair of laterally extending support legs fixedly mounted thereto at the other end of said track means for contacting the upper surface of the traction table.*

*17. The apparatus as defined in claim 12 wherein said body engaging means comprises a pair of upwardly extending separate arms, and wherein said means mounting said body engaging means to said extension means includes means permitting an adjustment of the lateral separation of said pair of arms.*

* * * * *